Feb. 24, 1970  D. F. LOMBARDO  3,497,786
MOTOR SPEED CONTROL CIRCUIT
Filed Aug. 30, 1967  3 Sheets-Sheet 1

INVENTOR.
DANIEL F. LOMBARDO
BY Watts, Hoffmann,
Fisher & Heinke
ATTORNEYS

Feb. 24, 1970  D. F. LOMBARDO  3,497,786
MOTOR SPEED CONTROL CIRCUIT
Filed Aug. 30, 1967  3 Sheets-Sheet 2

INVENTOR.
DANIEL F. LOMBARDO
BY Watts, Hoffmann,
Fisher & Heinke
ATTORNEYS

Feb. 24, 1970     D. F. LOMBARDO     3,497,786

MOTOR SPEED CONTROL CIRCUIT

Filed Aug. 30, 1967     3 Sheets-Sheet 3

INVENTOR.
DANIEL F. LOMBARDO
BY *Watts, Hoffmann,*
*Fisher & Heinke*
ATTORNEYS.

United States Patent Office 3,497,786
Patented Feb. 24, 1970

3,497,786
MOTOR SPEED CONTROL CIRCUIT
Daniel F. Lombardo, Cleveland, Ohio, assignor, by mesne assignments, to Picker Corporation, White Plains, N.Y., a corporation of New York
Filed Aug. 30, 1967, Ser. No. 664,321
Int. Cl. H02p 7/00
U.S. Cl. 318—258                                                                              12 Claims

ABSTRACT OF THE DISCLOSURE

Speed of rotation of a D.C. motor is controlled by unbalancing a differential amplifier, different amounts of unbalancing causing a second differential amplifier to become unbalanced at different points when a sawtooth voltage is supplied to it. The output of the second differential amplifier controls a switching circuit that causes the motor to rotate at different speeds. Dynamic braking is provided to prevent runaway of the motor if it is driving a heavy mechanical load in a direction aided by force of gravity acting on the load.

REFERENCED PATENTS AND APPLICATIONS (1) U.S. Patent No. 2,997,585, issued Aug. 22, 1961 to R. C. Schiring for "Combined Image Amplifier and Fluoroscopic Screen Above X-Ray Examination Table";

(2) U.S. Patent No. 3,013,155, issued Dec. 12, 1961 to R. C. Schiring for "X-Ray Table";

(3) Application Ser. No. 656,448, filed July 27, 1967 by E. A. Norgren for "X-Ray Apparatus Including Counter Balancing Mechanism for Spot Filmer or the Like."

BACKGROUND OF THE INVENTION

Field of the invention

This invention relates to a direct-current motor control circuit for X-ray apparatus, and, more particularly, to such a circuit for controlling the speed and direction of rotation of a direct current motor, and embodying dynamic braking means to prevent runaway of the motor if the mechanical load on the motor armature decreases or becomes "negative."

Description of the prior art

There are various situations in which a reversible motor connected through suitable reduction gearing to drive a heavy mechanical load must be capable of driving the load at a plurality of different controlled speeds both against and with the force of gravity acting on the mechanical load. In the latter situation, additional control of the motor is required to prevent the force of gravity acting on the load from causing the motor to run away and act as a generator. If the motor should run away, control of the speed of movement of the load is obviously lost. The motor is generally connected to the load through reduction gearing such that, if power is removed from the motor entirely, movement of the load will stop, even though the force of gravity tends to keep the load in motion. However, when the motor is energized to drive the load at slow speed, force of gravity may tend to cause the load to move at a faster rate of speed. Control of the rate of movement of the load by controlling the energization of the motor is thereby lost.

A motor speed control circuit embodying the invention is particularly applicable for use in medical applications, such as fluoroscopy and X-ray photography. In those applications, a heavy carriage carries an X-ray tube and a fluoroscopic screen or an X-ray spot film device that holds an image intensifier or an X-ray film to be exposed. The carriage must be capable of being moved to permit examination of various parts of a patient's body interposed between the X-ray tube and the fluoroscopic device or spot filmer. The patient generally is disposed on an examination table that may be rotated about a horizontal axis to various positions between substantially horizontal and vertical. The carriage likewise moves about the same horizontal axis. Thus, in one extreme position, movement of the carriage necessary to examine various portions of the patient's body is substantially in a horizontal direction. In the other extreme position, the carriage must be moved up and down in a substantially vertical direction. It is in those positions wherein the plane of movement of the carriage departs substantially from the horizontal that difficulty is encountered in maintaining control of the speed of movement of the carriage, when it is being moved downwardly.

Heretofore, such X-ray equipment has embodied large counterweights to balance the weight of the carriage when it is used in a position where its travel is a substantially vertical direction. The carriage has generally been moved manually although it may be motor driven. The use of such counterweights is disadvantageous in that it increases the overall weight of the equipment and thus makes it difficult to install and to move. Furthermore, the equipment must necessarily be bulky to accommodate the counterweight mechanism.

Various attempts have been made to solve the aforementioned problems. For example, the referenced Patent No. 2,997,585 describes a ceiling counterweight arrangement; the referenced Patent No. 3,013,155 discloses an X-ray table in which the weight of a patient partially counter-balances the weight of the carriage; and the Norgren application relates to apparatus in which the weight of the counterweights may be substantially reduced. In none of these prior art approaches, however, are counterweights completely eliminated. This is made possible in apparatus embodying the present invention, wherein a motor drives the carriage under control of the circuit of the invention, without the use of counterweights.

Accordingly, it is a general object of the invention to provide a motor speed control circuit, whereby the speed of movement of a heavy load mechanically connected to a motor is accurately controllable, whether the motor is acting on the load against the force of gravity or with the force of gravity acting on the load.

SUMMARY OF THE INVENTION

In accordance with the invention, a motor speed control circuit comprises switch means for controlling direction of rotation of a direct current (D.C.) motor, means for controlling the rotational speed of the motor by controlling the D.C. voltage applied to the motor armature, and means for maintaining the rotational speed of the motor constant under a constant load by utilizing a closed-loop feedback system.

The switch means for controlling the direction of motor rotation are manually actuable to determine directions of current flow through the motor field coil.

The means for controlling the speed of rotation of the motor includes a first differential amplifier, which may be unbalanced by applying a voltage to it from a manually-controlled source that is proportional to a desired motor rotational speed. When the first differential amplified is unbalanced, it unbalances a second differential amplifier in a manner to cause the second differential amplifier to provide an output signal during a certain portion of each cycle of a sawtooth voltage applied to it, the certain portion being determined by the unbalancing voltage applied to the first differential amplifier. The output signal from the second differential amplifier controls, through switch circuitry, the average voltage supplied to the D.C. motor armature to control the motor speed.

The motor armature supplies a feedback signal to the first differential amplifier, so that armature voltage is maintained constant. If the motor speed tends to increase under "no-load" or "negative load" conditions, a dynamic braking circuit is energized to place an impedance across the motor armature, and thus increase the armature load to maintain the armature rotational speed constant at its predetermined rate.

DESCRIPTION OF A PREFERRED EMBODIMENT

Figure 1:
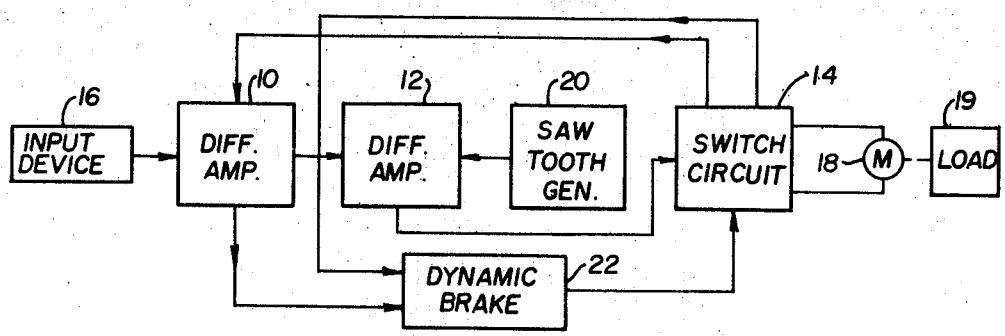
FIGURE 1 is a block diagram of a motor speed control embodying the invention.

FIGURE 1 illustrates, in simplified block diagram form, one embodiment of a motor speed control circuit embodying the invention. As shown, the control circuit comprises two differential amplifiers 10, 12. The first differential amplifier 10 receives one input signal from a switch circuit 14, and another manually-controlled input signal from an input device 16. The input signal from the switch circuit 14 is a feedback signal indicative of the speed of rotation of the armature of a motor 18, which is energized through the switch circuit. The input signal from the input device 16 is indicative of a desired speed of rotation of the armature of the motor 18, which is connected through suitable reduction gearing (not shown) to drive a heavy load 19. The input device 16 may comprise a manually adjustable potentiometer, a set of switches, or other suitable means for providing signals to the differential amplifier 10 whose amplitudes are proportional to various desired speeds of rotation of the motor 18. In a static condition, when the motor 18 is not rotating and there is a constant input signal of predetermined amplitude from the input device 16, the differential amplifier 10 is in a balanced or static condition. The differential amplifier 10 provides an output signal to one input of the second differential amplifier 12, which indicates that the amplifier 10 is then in a balanced condition.

If the differential amplifier 10 is unbalanced, as by application of an input signal of different amplitude from the input device 16, it provides a signal to the second differential amplifier 12, which is indicative of the amount of unbalance of the amplifier 10. A second input to the differential amplifier 12 is provided from a sawtooth generator 20 that produces a sawtooth voltage having a repetition rate of approximately 120 cycles per second. The differential amplifier 12 is then unbalanced during a portion of each cycle of the sawtooth input voltage from the generator 20, the portion being determined by the amplitude of the unbalancing voltage applied to it from the first differential amplifier 10. The output signal of the differential amplifier 12 controls the switch circuit 14, which in turn controls the D.C. voltage supplied to the motor armature. When the motor 18 is rotating at the desired speed, the feedback signal applied to the differential amplifier 10 from the switch circuit 14 causes the differential amplifier 10 to again be in a balanced condition. This causes the differential amplifier 12 to provide a signal to the switch circuit 14 at a proper time in each cycle of the sawtooth voltage applied to the differential amplifier 12 from the sawtooth generator 20 to maintain the speed of rotation of the motor 18 constant, assuming that the load 19 remains constant. If, due to a reduction in the mechanical load 19 on the motor 18, its speed tends to increase, the feedback signal supplied to the differential amplifier 10 causes an unbalance in that amplifier, which is transmitted to the second differential amplifier 12. This causes the motor 18 to be energized at a later time in each cycle of the sawtooth voltage applied to the differential amplifier 12, and thus reduces the speed of rotation of the motor 18.

Another feedback signal from the switch circuit 14 is provided to an input of a dynamic braking circuit 22 which also receives an input signal from the differential amplifier 10. If the load on the motor 18 effectively becomes "negative," as when the heavy load 19 moved by the motor 18 is moving with the force of gravity, the motor 18 tends to become a generator. In that case, the signal fed to the dynamic braking circuit 22 from the differential amplifier 10 causes a resistor to be placed across the armature of the motor 18 to effectively increase the armature load. This prevents the motor 18 from running away and maintains control of the speed of rotation of the motor by means of the signal supplied from the input device 16 to the differential amplifier 10. The signal from the switch circuit 14 prevents the braking circuit from operating under normal conditions.

Figure 3:
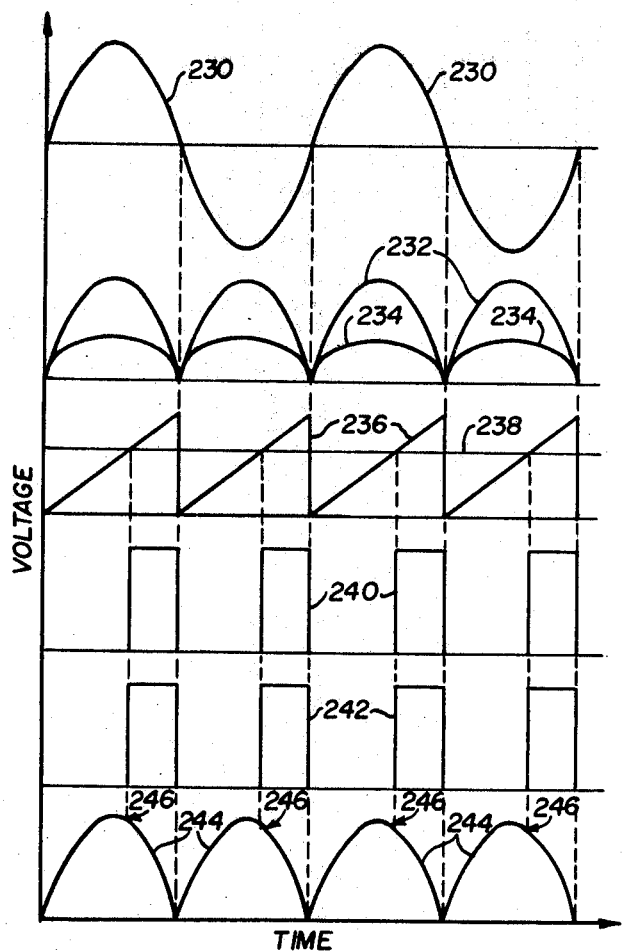
FIGURE 3 shows idealized waveforms of signals appearing at various points in the circuit shown in FIGURE 2; and, FIGURE 4 is a front elevational view of a prior art X-ray table in a vertical position with the body of the table shown in section.
Figure 2:
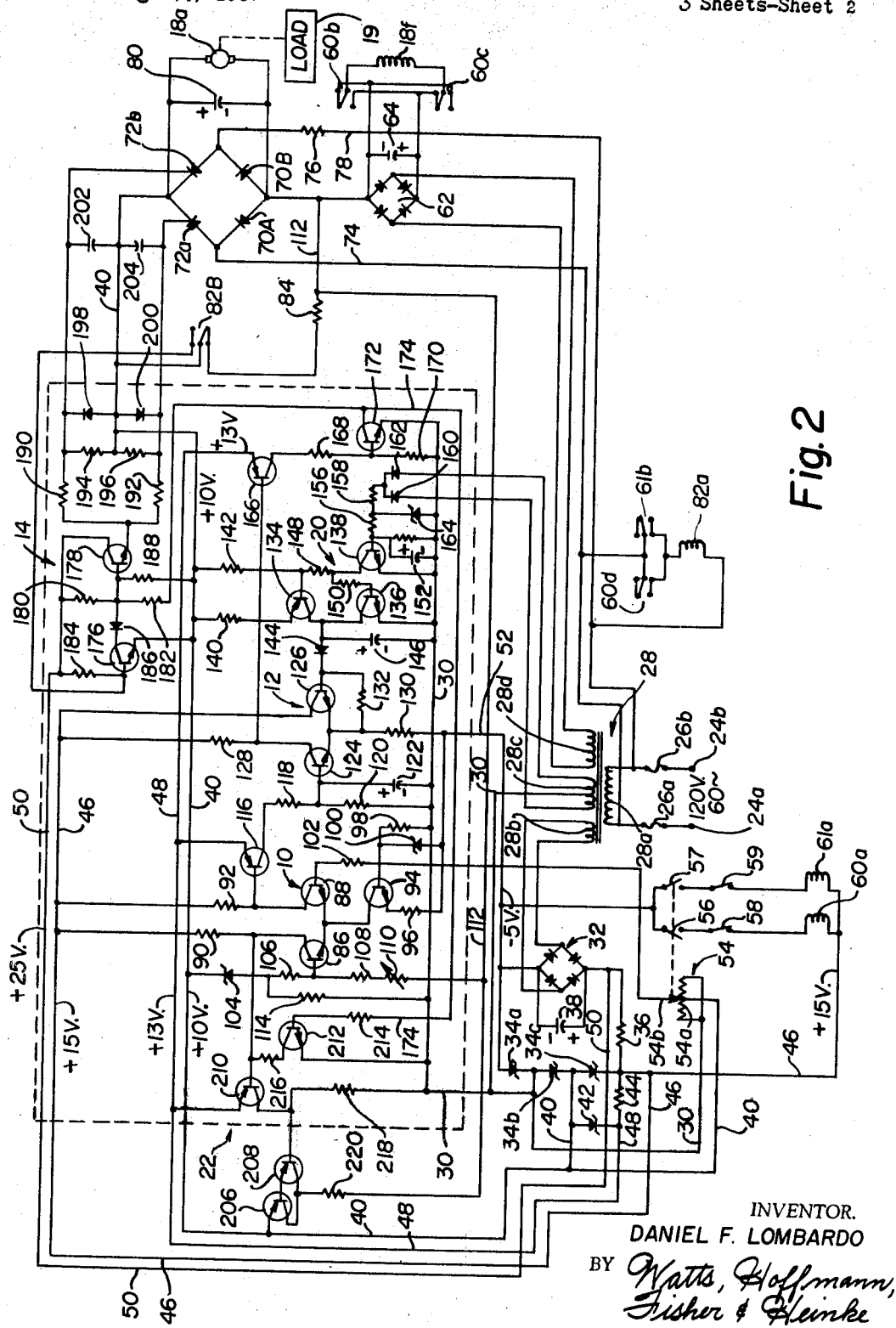
FIGURE 2 is a schematic diagram of a circuit constructed in accordance with the invention.

The invention will be better understood from the detailed schematic diagram shown in FIGURE 2, taken in conjunction with the waveform diagrams shown in FIGURE 3. Because of the complexity of the circuit shown in FIGURE 2, relay actuating coils and the relay sections actuated by the coils have not been shown as mechanically connected together. However, each relay is designated by a different reference numeral, with its actuating coil designated by the numeral and the suffix "*a*" and the relay sections designated by the same numeral and suffixes "*b*," "*c*" etc.

As shown in FIGURE 2, power is supplied to the control circuit embodying the invention from a 120-volt, 60-cycle source of power (not shown) connected to input terminals 24*a*, 24*b*. The terminals 24*a*, 24*b* are respectively connected through fuses 26*a*, 26*b* to a primary winding 28*a* of a transformer 28. The transformer 28 is provided with three secondary windings 28*b*, 28*c*, 28*d*. The winding 28*c* is center tapped, and a line 30 connected to the center tap serves as a reference voltage line for the control circuit.

Opposite ends of the secondary winding 28*b* are connected to opposite input points of a full-wave bridge rectifier, shown generally by the numeral 32. The rectifier 32 provides various regulated voltages necessary for operation of the control circuit embodying the invention. To this end, three Zener diodes 34*a*, 34*b*, 34*c* are connected in series with a resistor 36 across opposite output terminals of the rectifier 32. A capacitor 38 is also connected across the output terminals to smooth the pulsating output voltage of the rectifier. The juncture of the diodes 34*a*, 34*b* is connected to the reference line 30. The juncture of the diodes 34*b*, 34*c* is connected to a line 40 to provide a potential of approximately +10 volts. A fourth Zener diode 42 is connected in series with a resistor 44 across the diode 34*c*. The juncture of the resistors 44, 36 is connected to a line 46 to provide approximately +15 volts. The juncture of the diode 42 and the resistor 44 is connected to a line 48 to supply approximately +13 volts. The positive output terminal of the bridge 32 is connected directly to a line 50 to supply an unregulated voltage of approximately +25 volts. The negative output terminal of the rectifier 32 is connected to a line 52 to supply approximately −5 volts.

The input device 16 referred to in connection with FIGURE 1 comprises a potentiometer 54 having a winding 54*a* and a movable contact arm 54*b*. The winding 54*a* is center tapped, with the center tap being connected to the +10 volt line 40. The two ends of the winding 54*a* are connected together and to the reference potential line 30. The arm 54*b* of the potentiometer is preferably spring-biased to a center position (as shown), so that in its center or rest position the arm 54*b* is at a potential of approximately +10 volts. Any movement of the arm 54b away from the center position results in reducing the potential on the arm. The arm of the potentiometer 54b is manually adjustable, and the voltage present on that arm controls the speed of rotation of the motor 18 shown in FIGURE 1.

The arm 54b of the potentiometer 54 is mechanically connected to a pair of microswitches 56, 57, which are normally open when the arm 54b is in its center or rest position. Movement of the arm 54b in either direction from its rest position will cause one or the other of the microswitches 56, 57 to close. It is closure of one or the other of these microswitches that causes the motor 18 to rotate in one direction or in a reverse direction. The microswitch 56 is connected in series with a limit switch 58 and an actuating winding 60a of a relay between the −5 volt line 52 and the +15 volt line 46. The microswitch 57 is similarly connected in series with a limit switch 59 and an actuating coil 61a between the lines 52 and 46.

The secondary winding 28d of the transformer 28 is connected across two opposite input points of a full-wave bridge rectifier 62. Opposite output points of the rectifier 62 are connected to opposite sides of a smoothing capacitor 64 and through relay sections 60b and 60c to opposite ends of a field winding 18f of the motor 18 shown in FIGURE 1. The relay sections 60b, 60c serve as reversing switches to reverse the flow of current through the field winding 18f of the motor when the relay actuating winding 60a is energized by closure of the microswitch 56. When the winding 60a is unenergized, the sections 60b, 60c are in the position shown. That is, current flows from the positive output terminal of the rectifier 62 through the relay section 60c, upwardly through the field winding 18f and through the relay section 60b back to the negative terminal of the bridge. When the relay coil 60a is energized, the conditions of the sections 60b, 60c reverse, and current flows from the positive output terminal of the rectifier through the section 60b, downwardly through the field winding 18f and through the section 60c back to the negative terminal of the bridge. It is apparent that so long as the entire control circuit is energized the field winding 18f is also energized. However, the motor will rotate only when its armature 18a is energized under control of the differential amplifiers 10, 12 and switch circuit 14 to be later described in detail.

The armature 18a of the motor is mechanically connected through suitable reduction gearing (not shown) to the heavy load 19, and is energized from a full-wave rectifier bridge 68. The rectifier bridge 68 comprises a pair of diodes 70a, 70b connected in adjacent legs, and a pair of silicon controlled rectifiers 72a, 72b connected as the remaining two legs of the bridge. One input point of the rectifier 68 is connected through a line 74 to one side of the primary winding of the transformer 28, and the other input point of the rectifier is connected through a small resistor 76 and a line 78 to the other side of the primary winding 28a of the transformer. In order for the armature 18a of the motor to be energized, the silicon controlled rectifiers (SCR's) 72a, 72b, must be conductive during at least some portions of alternate half-cycles of the input voltage to the rectifier. It is that time in each half-cycle at which one of the SCR's conducts that determines the D.C. voltage supplied to the motor armature 18a, and thus controls the speed of rotation of the armature. A capacitor 80 is connected across the output terminals of the rectifier 68 to smooth the pulsating D.C. output of the rectifier.

A relay actuating coil 82a is also connected across the primary winding 28a of the transformer 28 through parallel, normally open, relay sections 60d, 61b. When neither of the relay actuating coils 60a or 61a is energized, the sections 60d, 61b are both open (as shown) and the relay actuating coil 82a is not energized. However, if the motor 18 is caused to rotate by movement of the arm 54b of the potentiometer 54 from the center position and consequent closure of one of the microswitches 56 or 57, either the relay section 60d or the section 61b will close to energize the coil 82a. A relay section 82b connects a small resistor 84 across the armature 18a of the motor, when the motor is not rotating and the actuating coil 82a is deenergized. The action of the resistor 84 provides quick stops of the armature 18a, when the potentiometer arm 54b is returned to its center position to stop rotation of the motor.

The first differential amplifier 10 comprises a pair of NPN transistors 86, 88, whose collectors are respectively connected through resistors 90, 92 to the +15 volt line 46. The emitters of the transistors 86, 88 are connected together and to the collector of an NPN transistor 94, whose emitter is connected to the −5 volt line 52 through a resistor 96. The base of the transistor 94 is connected to the reference potential line 30 through a resistor 98 and to the −5 volt line 52 through a Zener diode 100. The base of the transistor 94 is maintained at a positive potential with respect to the emitter of the transistor by the Zener diode 100, so that the transistor 94 serves as a constant current source for the transistors 86, 88.

The base of the transistor 88 is connected through a resistor 102 to the movable arm 54b of the speed control potentiometer 54. A voltage divider comprising a Zener diode 104, fixed resistors 106, 108, and a variable resistor 110 is connected between the +10 volt line 40 and a line 112 connected to the negative side of the armature 18a. The base of the transistor 86 is connected to the juncture of the resistors 106, 108. Because the lines 40 and 112 are connected to opposite sides of the armature 18a of the motor, the potential appearing at the base of the transistor 86 provides a measure of the voltage across the armature 18a, and hence a measure of the speed of rotation of the motor. The juncture of the diode 104 and the resistor 106 is connected to the reference potential line 30 through a resistor 114. Output from the differential amplifier 10 is taken from the collector of the transistor 88, which is connected to the base of a PNP transistor 116. The emitter of the transistor 116 is connected directly to the +13 volt line 48, and the collector of the transistor is connected to the reference potential line 30 through two series-connected fixed resistors 118, 120. A capacitor 122 is connected across the resistor 120.

The second differential amplifier 12 comprises a pair of NPN transistors 124, 126. The collector of the transistor 124 is connected through a resistor 128 to the +15 volt line 46, and the collector of the transistor 126 is connected directly to the +15 volt line 46. The emitters of the transistors 124, 126 are connected together and to the −5 volt line 52 through a resistor 130. The base of the transistor 126 is connected to the transistor emitter through a resistor 132. As previously mentioned, one input to the differential amplifier 12 is from the differential amplifier 10, which applies the input signal to the base of the transistor 124. Another input to the differential amplifier 12 is from the sawtooth generator 20, which provides a sawtooth voltage signal to the base of the transistor 126.

The sawtooth generator 20 comprises a PNP transistor 134, and two NPN transistors 136, 138. The emitter of the transistor 134 is connected to the +10 volt line 40 through a load resistor 140 and the base of that transistor is similarly connected through a resistor 142. The collector of the transistor 134 is connected directly to the collector of the transistor 136, and to the base of the transistor 126 (in the differential amplifier 12) through a diode 144. The emitter of the transistor 136 is connected directly to the reference potential line 30, and a capacitor 146 is connected across the collector-emitter circuit of the transistor 136.

The base of the transistor 134 is also connected to the collector of the transistor 138 through a resistor 148. The base of the transistor 136 is also connected to the collector of the transistor 138 through a resistor 150. The emitter of the transistor 138 is connected directly to the reference potential line 30. The base of the transistor 138 is connected to the reference potential line 30 through a parallel combination of a capacitor 152 and a resistor 154. A pulsating, regulated direct voltage is supplied to the base of the transistor 138 through a pair of series-connected resistors 156, 158. One end of that series-resistor combination is connected to the base of the transistor 138 and the other end is connected to the cathodes of a pair of similarly-poled diodes 160, 162. The anodes of the diodes 160, 162 are respectively connected to opposite ends of the secondary winding 28c of the primary power transformer 28. It will be recalled that a center tap on the winding 28c provides the system reference voltage on the line 30. A Zener diode 164 is connected between the juncture of the resistors 156, 158 and the reference potential line 30 to limit the maximum positive potential applied to the base of the transistor 138 to a predetermined value. In the present case, that potential is limited to approximately +5 volts.

When the transistor 133 becomes conductive due to the positive pulses appearing at its base, it develops a voltage drop across the resistor 142. This forward biases the transistor 134, thus causing it to conduct, while at the same time the transistor 136 is cut off. When the transistor 134 is conducting, it provides charging current for the capacitor 146. When the potential on the base of the transistor 138 falls, that transistor stops conducting and the voltage at its collector rises. This in turn causes the transistor 136 to become conductive and permits the capacitor 146 to discharge rapidly through the collector-emitter circuit of the transistor 136. In this manner, a sawtooth voltage is developed across the capacitor 146 and applied to the base of the transistor 126 in the differential amplifier 12. The sawtooth voltage has a peak amplitude of approximately +6 volts.

The output of the differential amplifier 12 is taken from the collector of the transistor 124, which is connected directly to the base of a PNP transistor 166. The emitter of the transistor 166 is connected directly to the +13 volt line 48. The collector of that transistor is connected through series-connected resistors 168, 170 to the reference potential line 30. The base of an NPN transistor 172 is connected to the juncture of the resistors 168, 170. The emitter of the transistor 172 is connected directly to the reference potential line 30. The collector of the transistor 172 is connected to a line 174.

The transistors 166, 172, along with two NPN transistors 176, 178, comprise the switch circuitry 14 previously referred to in connection with FIGURE 1. The line 174 from the collector of the transistor 172 is connected to the +25 volt line 50 through series-connected resistors 180, 182. The base of the transistor 176 is connected to the line 50 through a resistor 184, and the emitter of that transistor is connected directly to the +10 volt line 40. The collector of the transistor 176 is connected through a diode 186 to the juncture of the resistors 180, 182. The base of the transistor 178 is also connected directly to the juncture of the resistors 180, 182 and through a resistor 188 to the +10 volt line 40. The collector of the transistor 178 is connected directly to the +25 volt line 50.

The emitter of the transistor 178 is connected to a bridge circuit comprising resistors 190, 192, 194, 196. The juncture of the resistors 190, 192 is connected to the emitter of the transistor 178 and the juncture of the resistors 194, 196 is connected to the +10 volt line 40. The juncture of the resistors 190, 194, is connected to the gate electrode of the SCR 72b, and the juncture of the resistors 192, 196 is similarly connected to the gate electrode of the SCR 72a. A pair of oppositely-poled diodes 198, 200 are respectively connected across the resistors 194, 196. A pair of capacitors 202, 204 are also connected across the resistors 194, 196. When the transistor 178 conducts, gate voltages are developed across the resistors 194, 196, which are applied to the gate electrodes of the SCR's 72a, 72b to cause one of the SCR's to conduct during each half-cycle of the voltage supplied to the rectifier 68, during dynamic operation of the circuit.

The dynamic braking circuit 22 shown in FIGURE 1 is also shown in schematic form in the upper left portion of FIGURE 2. It comprises three PNP transistors 206, 208, 210 and an NPN transistor 212. The transistors 210, 212 act as switches to turn on and off the transistors 206, 208. To this end, the base of the transistor 212 is connected to the line 174 through a resistor 214 to receive gating pulses from the collector of the transistor 172 in the switch circuitry 14. The emitter of the transistor 212 is connected directly to the reference potential line 30, and the collector of the transistor is connected through a load resistor 216 to the collector of the transistor 86 in the first differential amplifier 10. The base of the transistor 210 is also connected directly to the collector of the transistor 86, the emitter of the transistor 210 is connected directly to the +13 volt line 48, and the collector of that transistor is connected through a load resistor 218 to the reference potential line 30.

The collector of the transistor 210 is connected directly to the base of the transistor 208. The emitter of the transistor 208 is connected to the base of the transistor 206. The emitter of the transistor 206 is connected directly to the +10 volt line 40, which line is also connected to one side (the positive side) of the armature 18a of the motor. The collectors of the transistors 206, 208 are connected together and through a resistor 220 to the line 112 that connects to the other side (the negative side) of the armature 18a of the motor. Thus, when the transistors 206, 208 are conductive, the resistor 220 is in effect placed across the armature 18a.

In understanding the operation of the embodiment of the invention shown in FIGURE 2, assume first that the movable arm 54b of the potentiometer 54 is in its center or rest position and that the microswitches 56, 57 are both open. In this condition, the relay actuating coils 60a, 61a are deenergized, so that the sections 60d, 61b are open. Thus, the relay actuating coil 82a is de-energized and the relay section 82b is in the position shown, with the small resistor 84 connected directly across the armature 18a of the motor.

The differential amplifier 10 is biased to cause the transistor 88 to conduct, because of the +10 volts applied to its base from the arm 54b of the speed control potentiometer 54. The transistor 86 is cut off, because approximately +7.7 volts is applied to its base which is less than its emitter potential. Because the transistor 88 is conducting, its collector voltage is less than +13 volts, which causes the base of the transistor 116 to be at a more negative potential than its emitter. This causes the transistor 116 to conduct. Conduction through the transistor 116 provides charging current for the capacitor 122, which charges to approximately +8 volts. This positive voltage appears at the base of the transistor 124 in the second differential amplifier 12.

The base of the transistor 126 in the second differential amplifier 12 is supplied with substantially linear sawtooth voltages from the sawtooth generator 20, the voltages attaining maximum values of approximately +6 volts. However, because the base of the transistor 124 is approximately +8 volts, the transistor 124 conducts heavily and the transistor 126 remains cut off. Thus, the voltage at the collector of the transistor 124 is relatively low, and this voltage is coupled to the base of the transistor 166 in the switch circuit 14.

When the collector voltage of the transistor 124 is low, it causes the transistor 166 to conduct and raises the collector potential of the transistor 166 to approximately +13 volts. This voltage rise increases the voltage on the base of the transistor 172, thus causing it to conduct. The voltage on the collector of the transistor 172 drops, which causes the voltage applied to the base of the transistor 178 to drop and causes that transistor to be cut off. Were the transistor 178 to conduct, it would develop gate signals across the resistors 194, 196 and cause the SCR's 72a, 72b to be turned on. In order to insure that this does not happen when the microswitches 56, 57 are both open, the transistor 176 is utilized. Inasmuch as the base of the transistor 176 is quite positive with respect to its emitter, the transistor 176 conducts heavily. This lowers the collector voltage of the transistor 176 and the base voltage of the transistor 178, and insures that the transistor 178 is reverse biased to prevent conduction.

The dynamic brake 22 has little or no effect on the circuitry in this static condition. This occurs because both transistors 210, 212 are non-conductive, both having reverse biases on their bases. The base of the transistor 210 is at a high positive potential derived from the collector of the transistor 86, which latter transistor is not conducting. The base of the transistor 212 is at a low potential near the reference potential, because the transistor 172 in the switch circuitry is heavily conducting and its collector, to which the base of transistor 212 is tied, is low in potential. The transistors 206, 208 are non-conductive in their emitter-collector circuits, because there is no negative collector voltage applied through the line 112. There will be some emitter-base current, but it is negligible in amount.

Assume now that it is desired to have the armature 18a rotate to move the load 19 in one direction or the other. This action is initiated by moving the arm 54b of the potentiometer 54 manually from its center or rest position. This causes either the microswitch 56 or the microswitch 57 to close. If the microswitch 57 is closed to energize the coil 61a, the conditions of the reversing sections 60b, 60c connected to the field winding 18f of the motor remain as shown. If, however, the microswitch 56 is closed to energize the relay coil 60a, the relay sections 60b, 60c are actuated to reverse the direction of current through the motor field winding 18f. In either case, however, the relay actuating coil 82a will be energized to actuate the relay section 82b to remove the resistor 84 from across the motor armature 18a and connect together the base and emitter of the transistor 176 in the switch circuitry 14. The limit switches 58, 59 are provided to prevent energization of the circuit to move the load 19 in either direction after its travel in either direction has reached predetermined limits.

As the movable arm 54b on the potentiometer 54 is moved in either direction from its center or rest position, it decreases the bias potential applied to the base of the transistor 88 in the first differential amplifier 10. When this occurs, the transistor 86 becomes increasingly conductive, while the transistor 88 becomes increasingly less conductive. As the transistor 88 becomes less conductive, its collector potential rises toward +15 volts. This progressively turns off the transistor 116, and progressively decreases the charging current through the capacitor 122. The amount of decrease of current through the capacitor 122 is, of course, related to the amount that the potentiometer arm 54b is moved away from its center or rest position.

When the voltage on the base of the transistor 124 decreases because of decreased conduction of the transistor 116, the balance of the differential amplifier 12 is upset. It will be recalled that the voltage present on the base of the transistor 126 is a sawtooth voltage that attains a maximum level of approximately +6 volts. Therefore, if the voltage on the base of the transistor 124 is less than +6 volts, the transistor 126 will conduct during that portion of each sawtooth voltage cycle during which the sawtooth voltage exceeds the voltage present on the base of the transistor 124. When the transistor 126 conducts, conduction through the transistor 124 decreases and the potential of the collector of the transistor 124 rises sharply. This rise in potential of the collector of the transistor 124 causes the transistor 166 to turn off, which in turn causes the transistor 172 to turn off. When the transistor 172 is cut off, its collector voltage rises, which turns on the transistor 178. When the transistor 178 is conducting, potentials are developed across the resistors 194, 196 which cause the SCR's 72a, 72b to conduct to energize the motor armature 18a. The portion of each half-cycle of the input voltage to the rectifier 68 during which the SCR's 72a, 72b conduct is thus dependent upon the voltage appearing at the base of the transistor 124 in the second differential amplifier 12. This voltage is, in turn, dependent on the degree of unbalance of the first differential amplifier 10, which is controlled by the amount that the movable arm 54b of the potentiometer 54 is moved from its center position.

FIGURE 3 shows a set of idealized waveforms appearing at various points in the circuit shown at FIGURE 2. A sine wave curve 230 represents the voltage present at the anodes of the diodes 160, 162 in the sawtooth generator 20. A curve 232 represents the rectified output of the diodes 160, 162, and a curve 234 represents the regulated pulsating voltage present on the base of the transistor 138. The sawtooth output voltage of the generator 20, which is coupled to the base of the transistor 126 in the second differential amplifier 12, is represented by a curve 236. The voltage present on the base of the other transistor 124 in the differential amplifier 12 is represented by a line 238. It is assumed that the sawtooth voltage 236 reaches a peak of approximately +6 volts, and the voltage present on the base of the transistor 124 has been arbitrarily chosen for purposes of illustration to be approximately +4 volts.

As previously pointed out, heavy conduction of the transistor 126 will occur only when the voltage on its base is more positive than the voltage on the base of the transistor 124. This conduction period is represented by pulses 240 occurring during each cycle of the sawtooth input wave 236. The pulses 240 also represent pulses appearing on the collector of the transistor 124, which turn off the transistors 166 and 172. This action causes positive pulses 242 to appear at the base of the transistor 178, and similar pulses to appear across the resistors 194, 196 and at the gate electrodes of the SCR's 72a, 72b to turn on one or the other of the SCR's at a time depending upon the start of each of the pulses 242. A waveform 244 represents the rectified voltage across the rectifier 68, if the SCR's were to conduct continuously in alternate half-cycles of the input voltage. Arrows 246 indicate the start of conduction of the SCR's 72a, 72b corresponding to the start of the pulses 242 applied to their gate electrodes. It is understood that the SCR's conduct alternately during successive half cycles.

When an unbalance is set up in the first differential amplifier 10 between the transistors 86, 88 by moving the potentiometer arm 54b from its center position, a closed-loop feedback circuit maintains a constant armature voltage even though the load on the motor may vary. This circuit comprises the Zener diode 104, the fixed resistors 106, 108 and the variable resistor 110, which form a voltage divider that is connected across the armature 18a. If the armature voltage changes, a portion of that voltage appears at the base of the transistor 86, which tends to change the degree of conduction of that transistor. The transistors 86, 88 rapidly seek a point of equilibrium. This action causes the voltage across the armature 18a to be relatively constant, since any change in the conduction of the transistor 86 changes the conduction of the transistor 88. As previously pointed out, any change in the conduction of the transistor 88 causes a change in the average voltage applied to the armature and hence changes the speed of rotation of the armature. The variable resistor 110 is used merely to set the maximum speed of rotation of the motor by simply increasing or decreasing the total resistance of the voltage divider connected across the armature.

When the load 66 is moving with the force of gravity, additional control of the motor is required to prevent the motor from running away. Under this condition, the motor becomes a generator driven by the load 66, and the voltage across the motor armature 18a increases. The motor is prevented from running away by the dynamic braking circuit 22 previously noted. The dynamic braking circuit 22 operates in the following manner:

As previously explained, in normal dynamic operation when the motor is operating against the weight of the load 66, the transistor 86 is conducting to a sufficient degree to make its collector and the base of the transistor 210 negative with respect to the emitter of the transistor 210. This causes the transistor 210 to conduct and provides a voltage drop across the resistor 218 of sufficient amplitude to maintain the transistors 206, 208 in a nonconductive condition. However, if the force of the load causes the motor armature 18a to rotate at a faster speed than the predetermined speed set by the potentiometer arm 54b, the voltage at the base of the transistor 86 decreases. This decreases conduction through the transistor 86, which causes the transistor 88 to conduct sufficiently to stop all gate pulses from being provided to the SCR's 72a, 72b. As the collector of the transistor 86 rises toward +15 volts, the potential on the base of the transistor 210 similarly rises and causes that transistor to become nonconductive. This lowers the base potential of the transistors 206, 208 and permits them to conduct, thus placing the small resistor 220 virtually directly across the armature of the motor 18a to effectively increase the armature load.

The transistor 212 is utilized to keep the dynamic braking circuit from operating when gate pulses are being applied to the SCR's 72a, 72b. As the gate pulses occur on the collector of the transistor 172, they also appear on the base of the transistor 212 through the line 174 and the resistor 214. These pulses turn on the transistor 212 and insure that the transistor 210 stays turned on for the duration of the pulse. Thus, the transistors 206, 208 are prevented from conducting in response to gate pulses coupled back through the line 112, by the conduction of the transistor 210.

Figure 4:
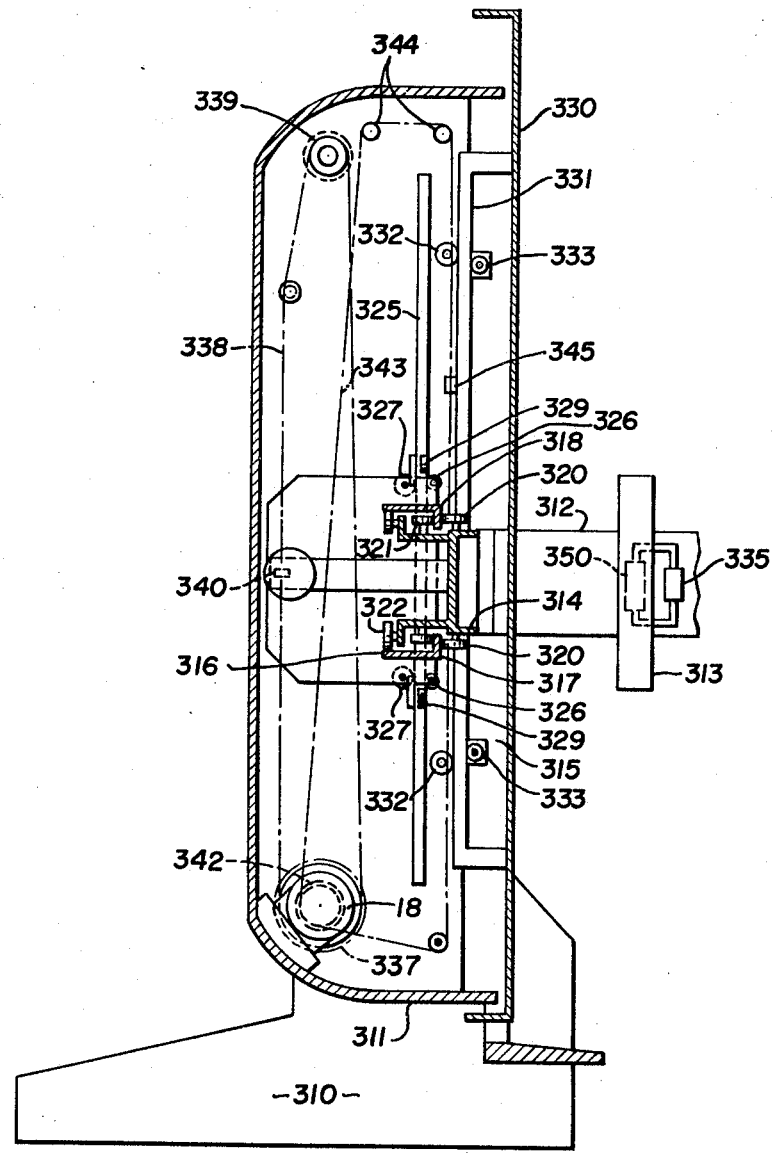

FIGURE 4 shows a prior art X-ray table with which the motor control circuit of the invention is particularly useful. FIGURE 4 is the same (except for reference numerals) as FIGURE 3 of the referenced Patent No. 3,013,155.

As shown in FIGURE 4, a pedestal is shown generally at 310. A table body and frame 311 is supported cantilever fashion on the pedestal 310. The pedestal 310 houses a suitable drive mechanism for tilting the table from a horizontal position to the vertical position shown, or 90° in the other direction to an opposite vertical position.

A tower or column 312 is supported by the table body 311. The column 312 supports a carrier 313 which is movable vertically on the column 312. The carrier 313 may support a fluoroscopic screen, a spot film device, or any of the other well known X-ray mechanisms which may suitably be mounted on the carrier. The column 312 also includes counterweights for the carrier 313 and the other usual components that are provided as part of the column assemblies of known structures. The column 312, the carrier 313 and the mechanism carried thereby constitute the load 19 (FIGURES 1 and 2).

Various guide ways or tracks to define the paths of travel of the column 312 and a movable table top 330 are provided. Wheels to follow the tracks and support the column and top are provided at both the front and the back of the table. For clarity of illustration and description, the rearward or back column and top support structures shown in FIGURE 4 will be described, it being understood that the equivalent structure is provided at the front of the table.

The column 312 has a support 314 which projects through an elongated aperture 315 in the back of the table. The aperture 315 permits rectilinear movement of the column 313 along a path which is longitudinal with respect to the body 311.

A trolley device 316 which is known as a "fluoroscopic carriage" is provided. The fluoroscopic carriage 316 includes first and second guide track members 317, 318 which extend transversely of the body 311. The column support portion 314 carries upper and lower horizontal support wheels 320, 321 respectively, which coact with the track portions 317, 318 to guide the column in rectilinear movement transverse to the table body 311. A plurality of vertical guide wheels 322 are carried by the column support portion 314. The vertical guide wheels 322 locate the support portion longitudinally relative to the body. The vertical guide wheels 322 also coact with the guide track portions 317, 318 to carry the weight of the column in rectilinear movement transverse to the table body when the body is in the vertical position.

A longitudinal guide track 325 is fixed to the body to form a portion of the body frame structure. Upper and lower column support rollers 326, 327 are fixed to the fluoroscopic carriage 316 to support the carriage and the remainder of the column 312. The rollers 326, 327 travel along the guide track 325 to carry the column 312 along a rectilinear path which is longitudinal with respect to the body 311. A pair of transverse guide rollers 329 also coact with the guide track 325 to position the fluoroscopic carrier 316 against movement transversely with respect to the body.

The table top 330 is mounted on the body 311 for rectilinear movement along a longitudinal path. The top 330 has a support track 331. A pair of support rollers 332 are positioned beneath the support track 331 to support the table top 330 in its movement along a rectilinear path.

A pair of positioning rollers 333 are also provided to coact with the top support 331. The positioning rollers 333 hold the top support 331 against the support rollers 332.

Movement of the top 330 is caused to be opposite to movement of the column 312 when the column is moved longitudinally with respect to the table body 311. To accomplish this opposite movement, an actuating handle 335 is provided. The actuating handle 335 is mounted on the carriage 313. The handle 335 is reciprocal along a path which is longitudinal with respect to the body 311. Movement of the handle 335 actuates the reversible power mechanism to drive the column 312 in the direction of the handle movement and to drive the table top 330 in the opposite direction.

The power mechanism includes the reversible motor 18 previously discussed. The motor 18 is connected to a column drive sprocket 337. A column mechanical interconnection in the form of a drive chain 338 is reeved over the sprocket 337 and a pulley 339 at the opposite end of the table body 311. One reach of the chain 338 is fixed to the column 312. In the arrangement shown, a connection is formed at 340 to connect the lower reach of the chain 338 to the column 312.

A table top drive sprocket 342 is also connected to the motor 18. A mechanical interconnection in the form of a top drive chain 343 is reeved over the sprocket 342 and around a plurality of top chain pulleys 344. The top chain 343 is connected to the top 330. In the disclosed arrangement a connection 345 is provided to fix the upper reach of the chain 343 to the top support 331.

With the top 330 connected to the upper reach of the top chain 343 and the column 312 connected to the lower reach of the column chain 338, rotation of the motor in either direction will cause movement of the column 312 and the top 330 in opposite directions. It will be recognized that any suitable mechanical interconnection can be substituted for the chain and sprocket arrangement disclosed, as long as there is a drive connection capable of conducting force from the motor to the top and column respectively to cause rectilinear movement as described in connection with the chain and sprocket arrangement.

A mechanism for actuating the control circuit is contained within a housing 350, shown diagrammatically in FIGURE 4. The housing 350 may contain the potentiometer 54 and the microswitches 56, 57, all of which are actuated by movement of the handle 335. The handle 335 is spring-loaded to a center position, as described in the referenced patent. Movement of the handle 335 from its center or rest position causes movement of the arm 54b of the potentiometer 54 from its center position and causes one or the other of the microswitches 56, 57 to close, all as previously described in connection with FIGURE 2.

Although an embodiment of the invention has been shown and described in detail, it is apparent that many changes and modifications may be made by one skilled in the art without departing from the true spirit and scope of the invention.

I claim:
1. A motor speed control circuit for a direct current motor having an armature and a field winding and mechanically connected to drive a load, the motor speed control circuit comprising:
   (a) means for supplying said field winding with a constant voltage of one polarity;
   (b) first differential amplifier means for receiving first and second input signals and providing a first output signal that is proportional to said first input signal modified by said second input signal;
   (c) means for providing said first input signal to said first differential amplifier means, said first input signal being proportional to a desired voltage across said armature;
   (d) feedback means responsive to actual voltage across said armature for providing said second input signal to said first differential amplifier means;
   (e) second differential amplifier means for receiving said first output signal and a third input signal and providing a second output signal when said third input signal exceeds said first output signal in amplitude;
   (f) generator means for providing said third input signal to said second differential amplifier means, said third input signal being cyclically varying in amplitude;
   (g) voltage supply means for supplying voltage to said armature; and
   (h) switch means responsive to said second output signal for controlling said voltage supply means.

2. The circuit of claim 1, further including means for reversing said polarity of said voltage for energizing said field winding for reversing direction of rotation of said motor.

3. The circuit of claim 1, further including braking means responsive to said actual voltage across said armature for electrically loading said armature when said actual voltage across said armature exceeds said desired voltage across said armature.

4. The circuit of claim 1, wherein said third input signal is a voltage having a sawtooth waveform.

5. The circuit of claim 3, wherein said third input signal is a voltage having a sawtooth waveform.

6. The circuit of claim 5, wherein said sawtooth waveform is substantially linear.

7. The circuit of claim 3, wherein said braking means comprises switching means for selectively placing impedance means in electrical circuit across said armature.

8. The circuit of claim 7, wherein said impedance means is resistor means.

9. The circuit of claim 1, wherein said second output signal is a pulse signal whose width is substantially proportional to an amount by which the amplitude of said third input signal exceeds the amplitude of said first output signal.

10. The circuit of claim 3, wherein said second output signal is a pulse signal whose width is substantially proportional to an amount by which the amplitude of said third input signal exceeds the amplitude of said first output signal.

11. The circuit of claim 4, wherein said second output signal is a pulse signal whose width is substantially proportional to an amount by which the amplitude of said third input signal exceeds the amplitude of said first output signal.

12. The circuit of claim 6, wherein said second output signal is a pulse signal whose width is substantially proportional to an amount by which the amplitude of said third input signal exceeds the amplitude of said first output signal.

References Cited

UNITED STATES PATENTS

| 3,348,114 | 10/1967 | Wright et al. | 318—302 |
| 3,401,325 | 9/1968 | Stringer | 318—302 |

ORIS L. RADER, Primary Examiner

K. L. CROSSON, Assistant Examiner

U.S. Cl. X.R.

318—269, 302, 331